(12) United States Patent
Burza et al.

(10) Patent No.: US 12,031,503 B2
(45) Date of Patent: Jul. 9, 2024

(54) GAS TURBINE ENGINE FAN

(71) Applicant: Rolls-Royce Deutschland Ltd & Co KG, Blankenfelde-Mahlow (DE)

(72) Inventors: Tomasz Burza, Rangsdorf (DE); Moritz Wirth, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 251 days.

(21) Appl. No.: 17/545,310

(22) Filed: Dec. 8, 2021

(65) Prior Publication Data
US 2022/0186685 A1 Jun. 16, 2022

(30) Foreign Application Priority Data
Dec. 10, 2020 (DE) ...................... 10 2020 132 953.9

(51) Int. Cl.
*F02K 3/06* (2006.01)
*F01D 5/02* (2006.01)
*F01D 25/32* (2006.01)

(52) U.S. Cl.
CPC .................. *F02K 3/06* (2013.01); *F01D 5/02* (2013.01); *F01D 25/32* (2013.01); *F05D 2220/36* (2013.01); *F05D 2260/31* (2013.01); *F05D 2260/40311* (2013.01)

(58) Field of Classification Search
CPC .................................... F01D 25/32; F02K 3/06
See application file for complete search history.

(56) References Cited

U.S. PATENT DOCUMENTS 8,540,492 B2 * 9/2013 Schreiber .................. F02C 7/04
416/245 R

FOREIGN PATENT DOCUMENTS

| DE | 102005013421 A1 | 9/2006 |
| DE | 102009016802 A1 | 10/2010 |
| DE | 102018116391 A1 | 1/2020 |

OTHER PUBLICATIONS

German Search Report dated Jul. 1, 2021 from counterpart German Patent Application No. DE 10 2020 132 953.9.

* cited by examiner

*Primary Examiner* — Courtney D Heinle
*Assistant Examiner* — John S Hunter, Jr.
(74) *Attorney, Agent, or Firm* — SHUTTLEWORTH & INGERSOLL, PLC; Timothy J. Klima (57) ABSTRACT

A fan of a gas turbine engine, which has a fan disk with a multiplicity of fastening elements which are spaced apart in a circumferential direction and which project axially forwardly from the fan disk, and a nose cone which is arranged upstream of the fan disk and which is connected by means of the fastening elements to the fan disk. On an axially front side of the fan disk, there is formed a periphery which runs in encircling fashion in the circumferential direction and which runs radially at the inside in relation to the axially rear end region of the nose cone, wherein the periphery which runs in encircling fashion in the circumferential direction forms a concave indentation, in such a way that water which ingresses into a gap between the axially rear edge of the nose cone and the fan disk passes into the concave indentation.

16 Claims, 6 Drawing Sheets

GAS TURBINE ENGINE FAN

CROSS-REFERENCE TO RELATED APPLICATIONS

This application claims priority to German Patent Application DE102020132953.9 filed Dec. 10, 2020, the entirety of which is incorporated by reference herein.

BACKGROUND OF THE INVENTION

Field of the Invention

The invention relates to a fan of a gas turbine engine as per the present disclosure.

A nose cone is arranged upstream of the fan disk on the axis of rotation of the fan and diverts the air passing from the engine intake in the direction of the fan blades. A nose cone is also referred to as an intake cone or as a spinner.

Description of Related Art including information disclosed under 37 CFR 1 0.97 and 1 0.98

In designs in which the nose cone is fastened to fastening elements that project axially forwardly from the fan disk, there is the risk of water ingressing into the nose cone, through a gap between the downstream edge of the nose cone and the fan disk, after the engine has been shut down. Ingressing water can collect in cavities of the fan disk and/or of the nose cone and, for example, freeze there overnight. This can give rise to imbalances that jeopardize the starting process.

BRIEF SUMMARY OF THE INVENTION

The invention is based on the problem of providing a fan that reliably prevents the ingress of water into cavities of the nose cone and/or of the fan disk of the fan.

This object is achieved by means of a fan having the features as disclosed herein. Refinements of the invention are indicated in the present disclosure.

According thereto, the invention relates to a fan of a gas turbine engine, which fan has a fan disk and a nose cone. The fan disk comprises a multiplicity of fastening elements which are spaced apart in a circumferential direction and which project axially forwardly from the fan disk and which are formed directly on the fan disk or on a part connected to the fan disk. The nose cone is arranged upstream of the fan disk and is connected by means of the fastening elements to the fan disk, wherein the nose cone, at an axially rear end region, forms an axially rear edge which adjoins the fan disk.

It is provided that, on an axially front side of the fan disk, there is formed a periphery which runs in encircling fashion in the circumferential direction and which runs radially at the inside in relation to the axially rear end region of the nose cone, wherein the periphery which runs in encircling fashion in the circumferential direction forms a concave indentation, in such a way that water which ingresses into a gap between the axially rear edge of the nose cone and the fan disk passes into the concave indentation. By means of the concave indentation, it is achieved that ingressing water can be discharged downward therein.

Accordingly, the solution according to the invention is based on the concept of providing a type of rain channel in the form of a concave indentation on the fan disk, which rain channel ensures that, if water ingresses into a gap formed between the axially rear edge of the nose cone and the fan disk, the ingressing water can be discharged without ingressing into the nose cone or into cavities in the nose cone, and/or into the fan disk, and forming ice there.

The present invention therefore provides, in the region of the connection between the nose cone and the fan disk, a construction that prevents the ingress of water.

It is pointed out that the concave indentation formed in the encircling periphery may have a wide range of cross-sectional shapes. Here, a concave indentation refers to any structure that can receive and discharge ingressing water. In cross section, the concave indentation may form a smooth, edge-free transition to axially adjoining structures, or may alternatively have edges. A duct which, in cross section, has rectilinearly running wall sections and corners in relation to adjoining structures also forms a concave indentation within the meaning of the present invention.

One embodiment of the invention provides that the encircling periphery furthermore forms a radially outer contact surface which is formed axially in front of the concave indentation, wherein the nose cone, at its axially rear end region, lies in watertight fashion against the contact surface. Through the provision of a contact surface against which the nose cone lies in watertight fashion, the risk of the ingress of water is additionally reduced. The contact surface furthermore provides an additional mechanical support for the nose cone which reinforces the structural integrity of said nose cone in the event of impact of foreign bodies, for example in the event of bird strike.

Here, there are several possible design variants with regard to the manner in which the nose cone lies in watertight fashion against the radially outer contact surface of the encircling periphery.

In a first design variant, it is provided that the nose cone, at its axially rear end region, lies without play against the radially outer contact surface. The tolerances of nose cone and contact surface are thus such that there is substantially no gap between these components.

In a second, alternative design variant, it is provided that the nose cone, at its axially rear end region, lies with a radial gap against the radially outer contact surface, wherein the radial gap is dimensioned so as to be watertight. Here, watertightness of the gap arises automatically if the gap is sufficiently small owing to the physical mechanisms of cohesion and adhesion. Such a gap may for example be provided by a clearance fit between the nose cone and the contact surface.

This design variant has the advantage that pressure equalization in the interior of the nose cone is possible via the gap, and said interior is not closed off in air-tight fashion. The gap allows ventilation of the nose cone.

A further embodiment provides that the radially outer contact surface runs obliquely or parallel with respect to the axial direction over an axial length, wherein the nose cone and the radially outer contact surface lie against one another over the axial length. Owing to the fact that the nose cone and contact surface lie against one another not merely in punctiform fashion, the quality of the watertightness of the gap is improved, and furthermore, the mechanical support of the nose cone by the contact surface is further improved. Here, the angles of inclination of the nose cone and of the contact surface correspond.

It is generally pointed out that the nose cone may have a wide range of shapes. For example, the nose cone is in the form of an elliptical nose cone or in the form of a conical nose cone. The expression "nose cone" is used generally for all possible shapes of the nose cone.

One embodiment of the invention provides that the concave indentation is configured such that water which passes into it can run downward in the circumferential direction and, at a lower collection point, escape again through the gap between the axially rear edge of the nose cone and the fan disk. For this purpose, provision is made in particular for the concave indentation to extend in the circumferential direction over 360°. Here, ingressing water automatically flows downward in the concave indentation owing to the force of gravity. Said water collects at a lower collection point and can exit the concave indentation again in the same way as it entered, specifically through the gap present between the axially rear edge of the nose cone and the fan disk, without water having passed into the interior of the nose cone or into cavities of the fan disk.

In one embodiment of the invention, provision is made for the periphery which runs in encircling fashion in the circumferential direction to run radially outside the fastening elements. It is hereby ensured that water that has ingressed is discharged through the concave indentation as early as possible. The periphery which runs in encircling fashion in the circumferential direction is formed in particular at the outer edge of the face side of the fan disk.

A further embodiment of the invention provides that the periphery which runs in encircling fashion in the circumferential direction and which forms the concave indentation is an integral, single-piece constituent part of the fan disk. The encircling periphery is for example formed on the fan disk by turning.

Alternatively, provision may be made for the periphery which runs in encircling fashion in the circumferential direction and which forms the concave indentation to be formed by a separate ring which is connected to the axially front side of the fan disk. This offers a wider selection of methods for producing the concave indentation. For example, provision may be made for the ring to be produced with the concave formation without the need for a cutting process. A separate fixed connection of the ring to the axially front side of the fan disk is however necessary.

In this regard, one design variant provides that the ring additionally forms the axially forwardly projecting fastening elements by means of which the nose cone is connected to the fan disk. Alternatively, the fastening elements are likewise formed integrally with the fan disk.

The mechanical connection between the nose cone and the fan disk may basically be realized in a wide variety of forms. In this regard, one embodiment provides for the nose cone to be connected by means of bolts or screws to the fastening elements that project from the fan disk.

The axially projecting fastening elements may for example be of lug-like or finger-like form, that is to say their length is greater than their width and/or their diameter.

In one design variant, the nose cone is internally hollow. It is composed, for example, of glass-fiber-reinforced plastic.

A further design variant provides that the fan disk, at its axially front side, forms fastening lugs, which are spaced apart in the circumferential direction, for receiving balancing weights which serve to minimize an imbalance of the fan disk.

In one embodiment of the invention, the fan is of BLISK-type design, that is to say the fan disk and the fan blades are of integral (single-piece) form. A design with individual fan blades that are connected to the fan hub is however likewise possible.

According to a further aspect of the invention, the present invention relates to a gas turbine engine having a fan according to the invention. Provision may be made here for the gas turbine engine to have:

an engine core which comprises a turbine, a compressor and a core shaft connecting the turbine to the compressor and formed as a hollow shaft;

a fan according to the invention which is positioned upstream of the engine core; and a gear box that receives an input from the turbine shaft and outputs drive to the fan so as to drive the fan at a lower rotational speed than the turbine shaft.

One design embodiment in this regard may provide that the turbine is a first turbine, the compressor is a first compressor, and the turbine shaft is a first turbine shaft;

the engine core further comprises a second turbine, a second compressor, and a second turbine shaft which connects the second turbine to the second compressor; and the second turbine, the second compressor, and the second turbine shaft are disposed with a view to rotating at a higher rotational speed than the first turbine shaft.

It is pointed out that the present invention is described with reference to a cylindrical coordinate system which has the coordinates x, r, and φ. Herein x indicates the axial direction, r indicates the radial direction, and φ indicates the angle in the circumferential direction. The axial direction herein is defined by the machine axis of the gas turbine engine in which the present invention is implemented, wherein the axial direction is that from the engine inlet in the direction of the engine outlet. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are) $Jkg^{-1}K^{-1}/(ms^{-1})^2$. The fan tip loading may be in an inclusive range delimited by two of the values in the previous sentence (that is to say that the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at constant speed can be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least some of the fan blades can be machined from a block and/or at least some of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

BRIEF DESCRIPTION OF THE SEVERAL VIEWS OF THE DRAWING(S)

The invention will be explained in more detail below on the basis of a plurality of exemplary embodiments with reference to the figures of the drawing. In the drawing.

DETAILED DESCRIPTION OF THE INVENTION

Figure 1:
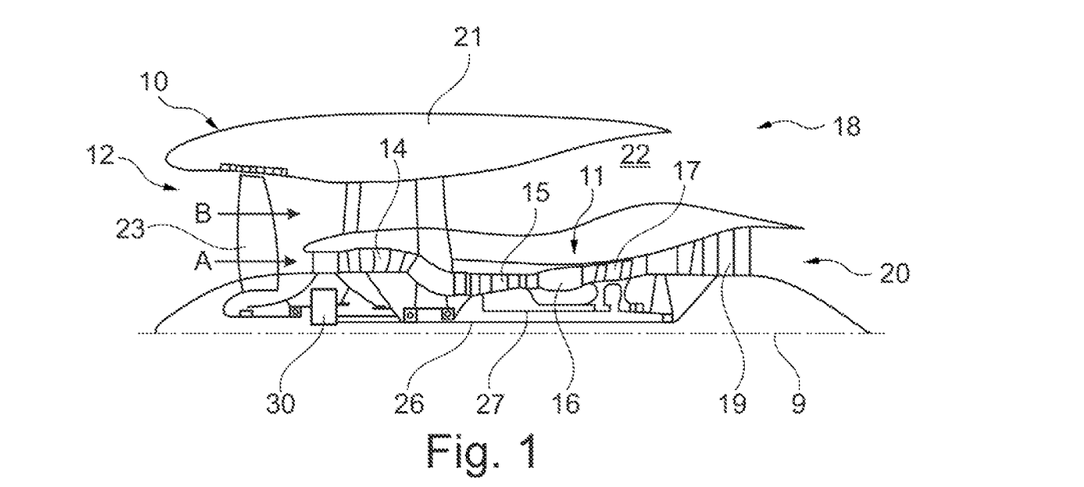
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
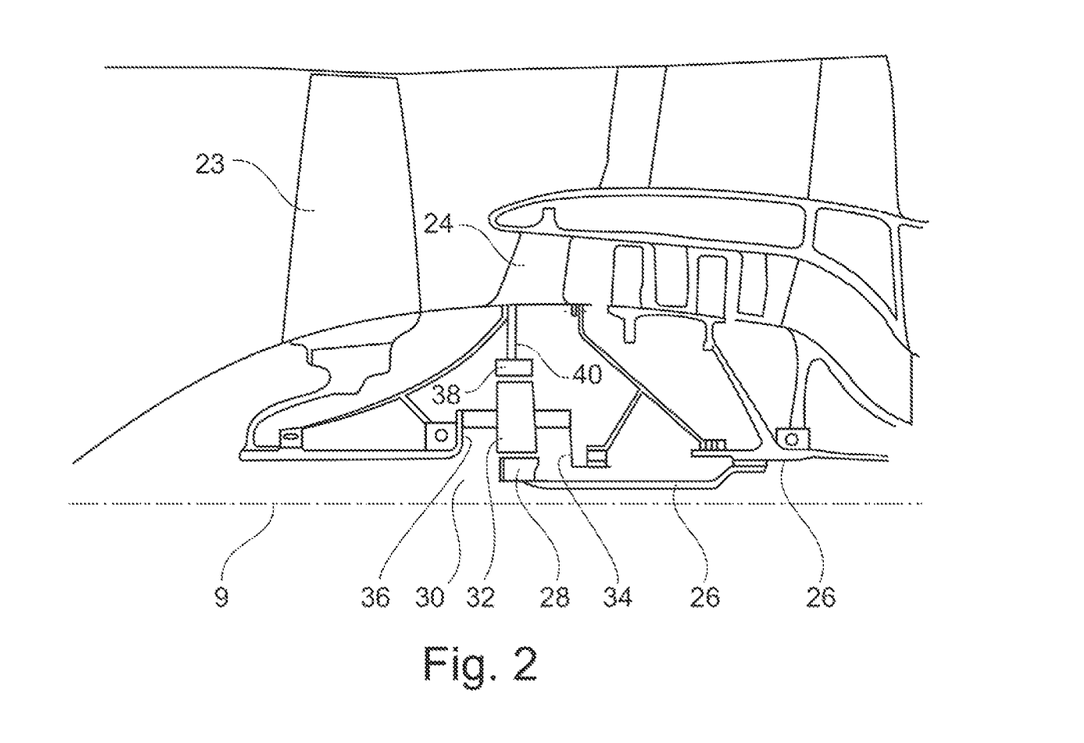
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
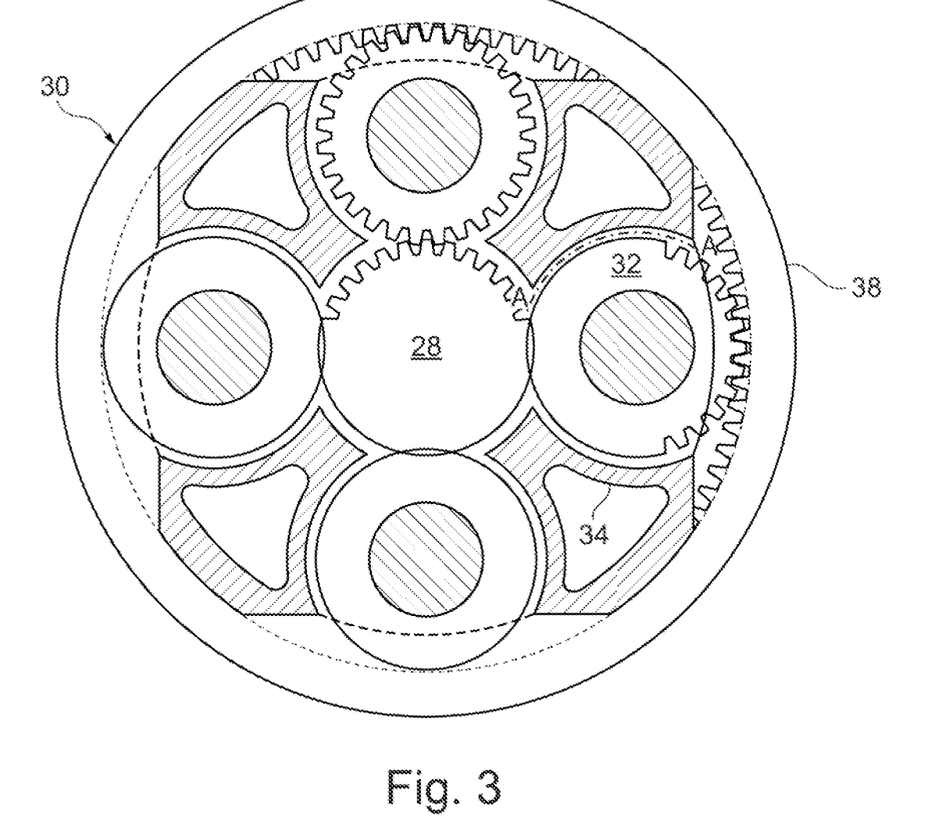
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

In the context of the present invention, it is the design of the connection between a nose cone of a fan and the fan disk that is of importance. Here, the fan may be the fan 23 of FIGS. 1 and 2 or any other fan of a gas turbine engine.

Figure 10:
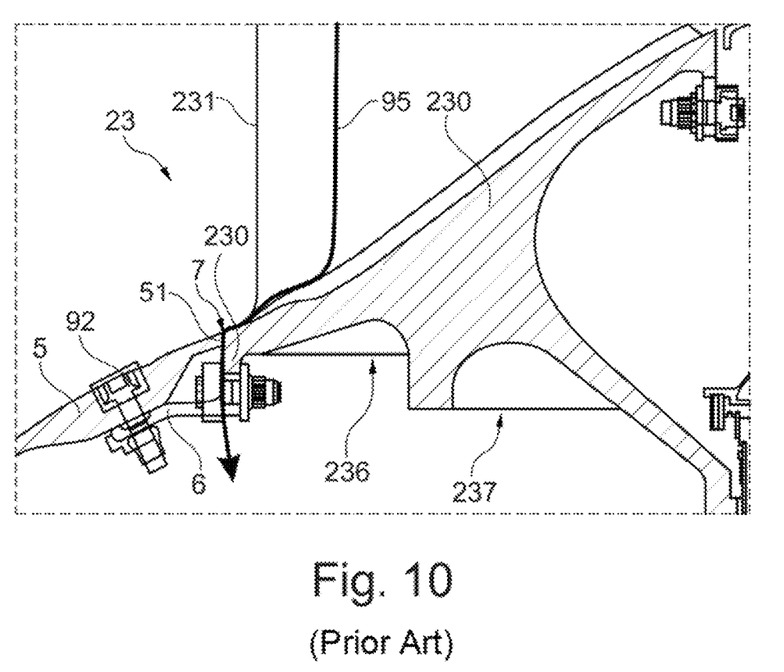
FIG. 10 shows an example of a fan disk with nose cone according to the prior art.

Firstly, a fan with a nose cone according to the prior art will be described on the basis of FIG. 10. The fan 23 comprises a fan disk 230, which is driven by means of a turbine shaft (not illustrated) of the gas turbine engine. A multiplicity of fan blades 231 are formed radially at the outside on the fan disk 230. The fan may be of BLISK-type design, in which case the fan disk 230 and the fan blades 231 are of integral design.

A nose cone 5 is arranged upstream of the fan disk 230 and is connected to the fan disk 230 by means of fastening elements 6. The fastening elements 6 project axially forwardly from the fan disk 230. The connection of the nose cone 5 to the fastening elements 6 is realized by means of fastening bolts 92 or the like.

In the case of such a construction, there is the risk that water can ingress through an axial gap 7 that is formed between an axially rear edge 51 of the nose cone 5 and the fan disk 230. Such a gap 7 is necessary in order to allow an expansion of the nose cone 5 with increasing temperature. Since the fastening elements 6 do not run in annular fashion in the circumferential direction but are spaced apart in the circumferential direction, they, or their connection to the nose cone 5, cannot prevent the ingress of water that ingresses through the gap 7.

The risk of an ingress of water exists in particular after the engine has been shut down, when centrifugal force no longer acts on any water droplets. Water, which for example runs down the fan blades 231 and then ingresses into the gap 7, is illustrated schematically in FIG. 10 by the arrow 95. Such water can collect in cavities 236, 237. If the water freezes overnight, for example, the frozen water forms an unplanned imbalance of the fan disk 230.

Figure 4:
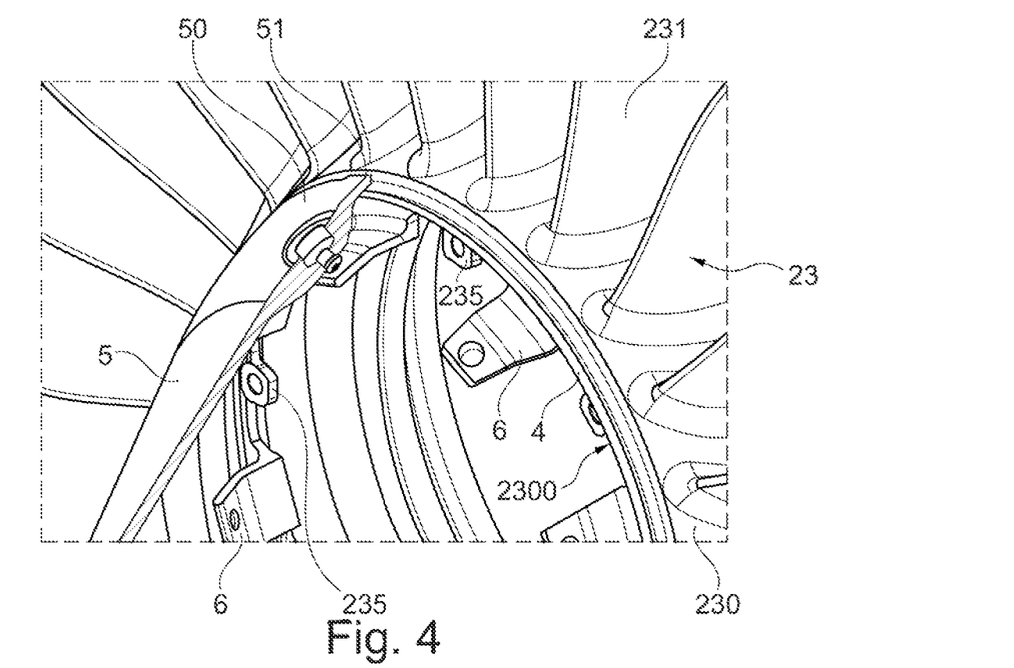
FIG. 4 shows a perspective view of the face-side region of a first exemplary embodiment of a fan disk with nose cone which has lug-like fastening elements for the fastening of the nose cone and an encircling periphery with a concave indentation, wherein the nose cone is only partially illustrated.

FIG. 4 shows a first exemplary embodiment of a fan 22, on which a nose cone 5 is arranged at the upstream side. The nose cone 5 is internally hollow and is composed for example of a fiber-reinforced plastic. Said nose cone forms a rear end region 50 and, on this, and axially rear edge 51.

The fan 23 comprises a fan disk 230, on the radially outer side of which a multiplicity of fan blades 231 extends. The fan disk 230 and the fan blades 231 may be of BLISK-type design. The fan disk 230 has an axially front side 2300, at which there is formed a multiplicity of fastening elements 6 which are spaced apart from one another in the circumferential direction and which project axially forwardly from the fan disk 230 and which have a lug-like form. The nose cone 5 is fastened to the fan disk 230 at the fastening elements 6.

At the axially front side 2300, the fan disk 230 furthermore forms a periphery 4 which runs in encircling fashion over 360° in the circumferential direction, the structure of which periphery will be discussed on the basis of FIGS. 5-7. At the axially front side 2300 of the fan disk 230, there are furthermore formed fastening lugs 235 which are spaced apart in the circumferential direction and which each serve for receiving a balancing weight.

Figure 5:
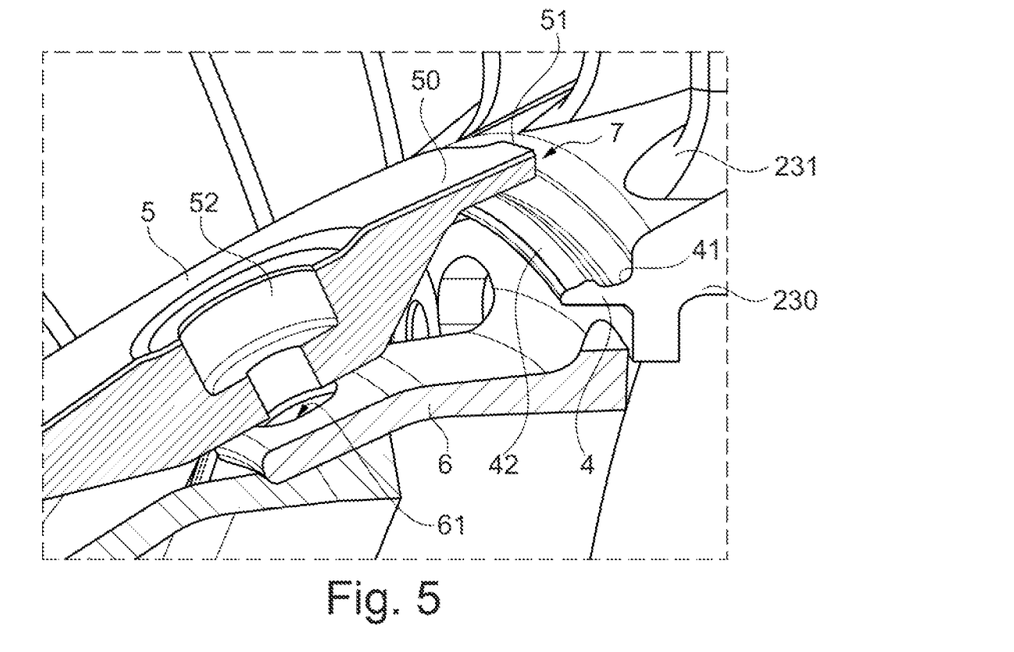
FIG. 5 is an enlarged perspective illustration of the fastening elements and of the encircling periphery of the fan disk of FIG. 4.
Figure 6:
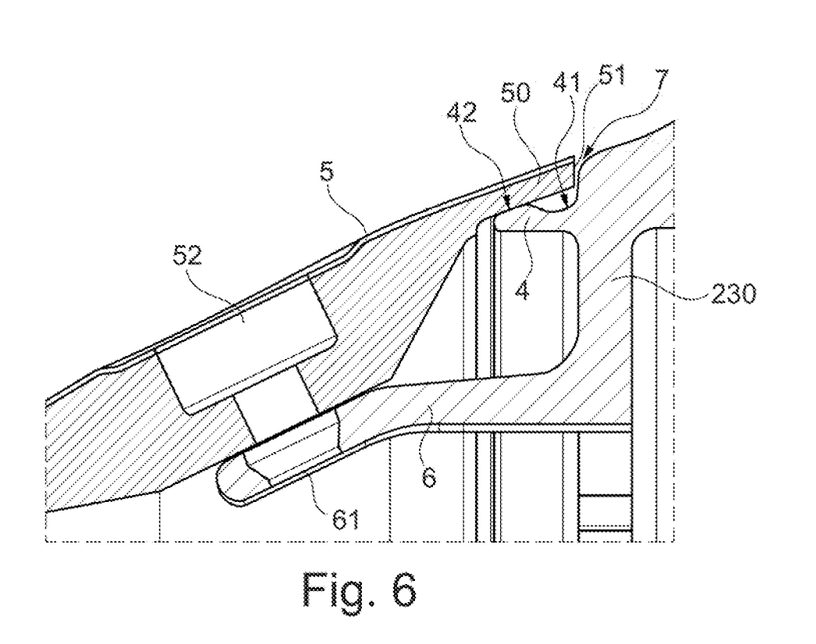
FIG. 6 is an enlarged illustration of the fastening elements and of the encircling periphery of the fan disk of FIG. 4 in longitudinal section.

Reference will be made below to FIGS. 5 and 6 which, in a perspective view and in a sectional view, illustrate the connection between the fan disk 230 and the nose cone 5 on an enlarged scale.

It can be seen here that the encircling periphery 4 forms a concave indentation 41 and a radially outer contact surface 42. The concave indentation 41 directly adjoins a vertical wall section of the fan disk 230. The contact surface 42 is formed axially in front of the concave indentation 41. The nose cone 5, in its rear end region 50, lies against the contact surface 42 over a certain length. The encircling periphery 4 is thus arranged radially at the inside in relation to the axially rear end region 50 of the nose cone 5.

As can be seen in particular in FIG. 6, an axial gap 7 extends between the axially rear edge 51 of the nose cone 5 and the fan disk 130, through which gap water can ingress under corresponding conditions. Here, the concave indentation 41 of the encircling periphery 4 is arranged such that ingressing water is received by the concave indentation 41. The concave indentation 41 forms a type of rain channel for ingressing water.

Ingressing water is discharged downward in the circumferential direction in the concave indentation 41. Said water collects at a lower collection point of the concave indentation 41 owing to gravitational force. Said water can emerge from the gap 7 again there.

FIGS. 5 and 6 also illustrate the mechanical connection between the nose cone 5 and the fan disk 130 in more detail. The axially forwardly projecting fastening elements 6 of the fan disk 230 each form an opening 61 that receives a fastening receptacle 52 of the nose cone 5. The actual fastening is realized by means of fastening bolts (not illustrated) that are guided through the fastening receptacle 52 and the opening 61.

It is pointed out that the encircling periphery 4 is formed radially at the outside in relation to the fastening elements 6. Said periphery extends axially forward to a lesser extent than the fastening elements 6, as can be seen for example from FIG. 6.

Figure 7:
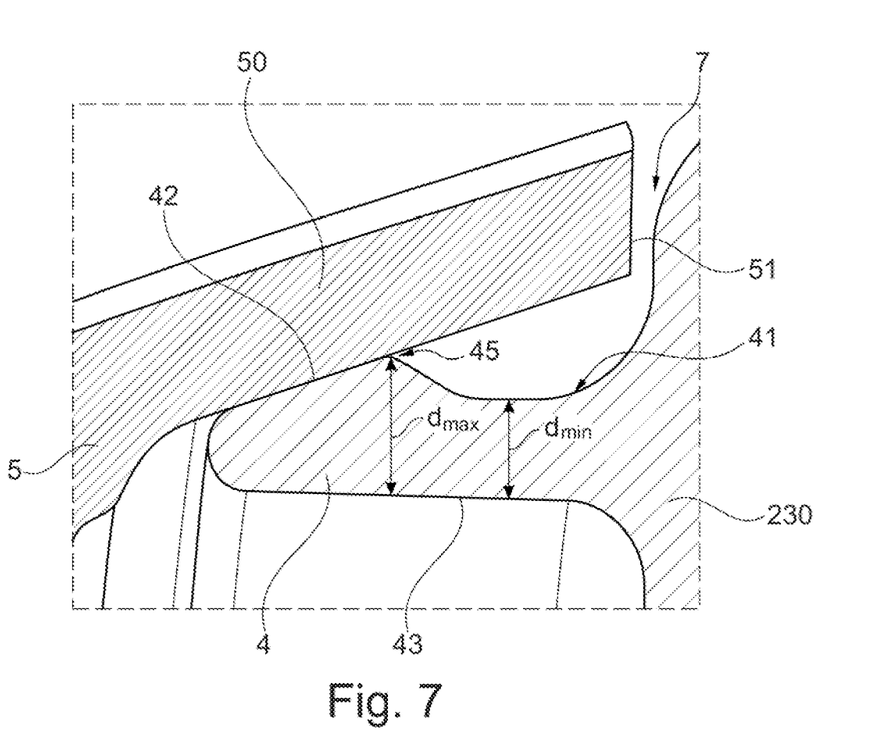
FIG. 7 is a yet further enlarged illustration of the encircling edge of the fan disk of FIG. 4, wherein the encircling edge forms not only the concave indentation but also a contact surface for the axially rear end region of the nose cone.

FIG. 7 is an enlarged illustration of the encircling periphery 4, which forms the concave indentation 41 and the radially outer contact surface 42. As already discussed with regard to FIGS. 5 and 6, there is a gap 7 between the axially rear edge 51 of the nose cone 5 and the fan disk 230, through which gap water can ingress. Ingressing water is discharged by the concave indentation 41.

The nose cone 5 is supported in its axially rear end region 50 by the contact surface 42 of the encircling periphery 4. Here, the contact surface 42 and the nose cone 5 run parallel over a certain axial distance, and have the same inclination with respect to the longitudinal axis or X axis. Two design variants are possible here.

In one design variant, there is a clearance fit between the nose cone 5 and the contact surface 42, such that a radial gap 45 exists between the contact surface 42 and the nose cone 5. Here, the radial gap 45 is dimensioned such that any water that ingresses into the concave indentation 41 via the axial gap 7 cannot pass through the gap 45 owing to the surface tension of the water. At the same time, however, the gap 45 allows ventilation of the interior of the nose cone 5.

In a second design variant, the nose cone 5 lies as tightly as possible, and accordingly without the formation of a radial gap, against the contact surface 42.

It is pointed out that, owing to the oblique profile of the contact surface 42, the radial diameter d of the encircling periphery 4 initially increases in the axial direction toward the fan disk 230, before subsequently decreasing again in the region of the concave indentation 41. In the axial direction, said diameter firstly forms a maximum $d_{max}$ and subsequently forms a minimum $d_{min}$. The underside 43 of the encircling periphery 4 is of planar form and extends in the axial direction.

Figure 8:
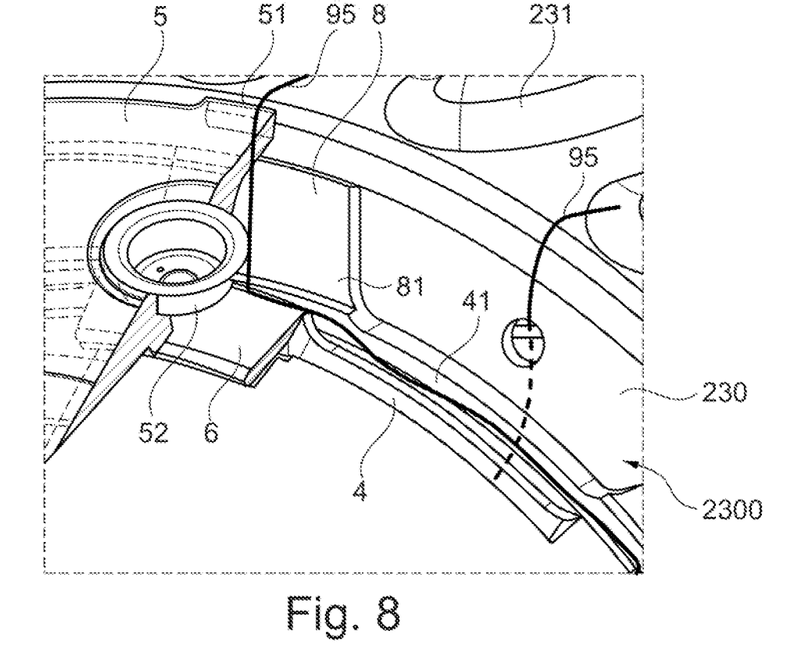
FIG. 8 shows a perspective view of the face-side region of a second exemplary embodiment of a fan disk with nose cone which has lug-like fastening elements for the fastening of the nose cone and an encircling periphery with a concave indentation, wherein the lug-like fastening elements and the encircling edge are formed on a separate component that is connected to the fan.
Figure 9:
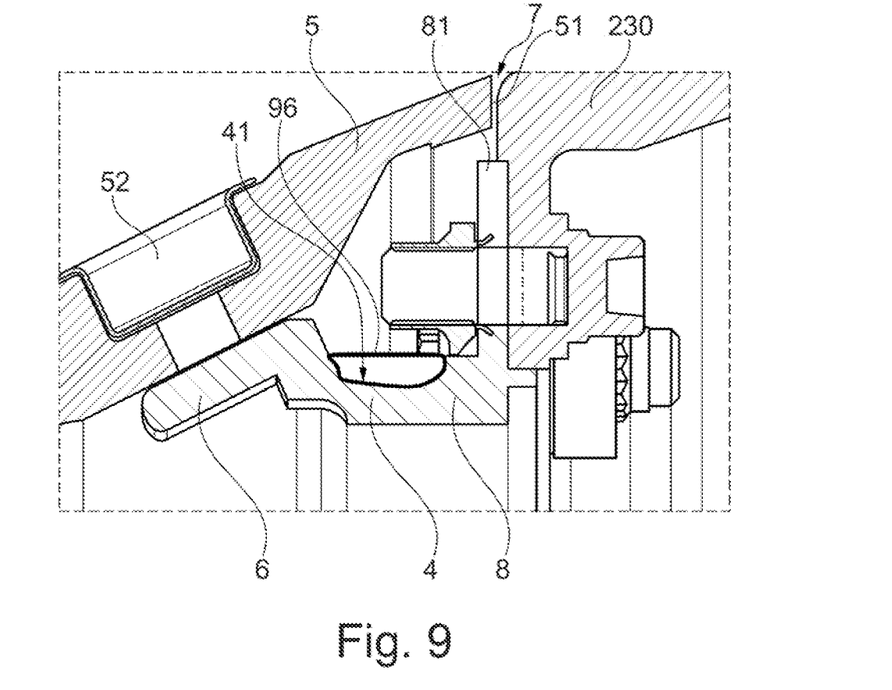
FIG. 9 shows the arrangement according to FIG. 8 in a sectional illustration.

FIGS. 8 and 9 show an alternative exemplary embodiment, in which the encircling periphery 4 and the fastening elements 6 are not formed integrally with the fan disk 230, as is the case in the exemplary embodiment of FIGS. 4-7, but are formed on a separate ring 8 that is connected to the axially front side 2300 of the fan disk 230. The fastening is realized for example in the region of fastening lugs 81.

The encircling ring 8 forms the concave indentation 41 by forming a corresponding duct. The fastening lugs 6 for the connection of the nose cone 5 are formed on the ring 8 equidistantly in the circumferential direction. Here, as in FIGS. 5-7, the nose cone 5 has fastening receptacles 52 for receiving fastening bolts.

The mode of operation is as follows. There is again a gap 7 between the axially rear edge 51 of the nose cone 5 and the face side of the fan disk 230, through which gap water can ingress. Water, which ingresses through the gap 7 and then flows into the concave indentation 41, is illustrated schematically in FIG. 8 by arrows 95. Ingressing water 96 collects in the concave indentation 41 and is discharged downward in the circumferential direction therein. The ring 8, which forms both the concave indentation 41 and the fastening lug 6, is in this case mechanically connected to the fan disk 230.

It will be understood that the invention is not limited to the embodiments described above, and various modifications and improvements can be made without departing from the concepts described herein. For example, the exact shape of the encircling periphery and of the concave indentation 41 that is illustrated in the figures is to be understood merely as an example.

It is furthermore pointed out that any of the features described can be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A fan of a gas turbine engine, which has:
   a fan disk with a plurality of fastening elements, formed as brackets which are spaced apart in a circumferential direction and which project axially forwardly from the fan disk and which are formed directly on the fan disk or on a part connected to the fan disk,
   a nose cone which is arranged upstream of the fan disk and which is connected by the fastening elements to the fan disk, wherein the nose cone, at an axially rear end region, forms an axially rear edge adjacent the fan disk,
   on an axially front side of the fan disk, an encircling periphery which runs in an encircling manner in the circumferential direction and which runs radially inside of the axially rear end region of the nose cone, wherein the encircling periphery includes a concave indentation that forms a circumferentially continuous channel around the encircling periphery, the axially rear edge being positioned axially forward of the axially front side of the fan disc to form a radially extending axial gap between the axially rear edge and the axially front side of the fan, the radially extending axial gap creating a radial passage between an exterior of the nose cone at the axially rear end region and the concave indentation to allow water ingress from the exterior of the nose cone at the axially rear end region to the concave indentation,
   wherein the encircling periphery, the concave indentation and the circumferentially continuous channel extend circumferentially a complete 360°.

2. The fan according to claim 1, wherein the encircling periphery furthermore forms a radially outer contact surface positioned axially forward of the concave indentation, wherein the nose cone, at the axially rear end region, engages in watertight fashion against the contact surface.

3. The fan according to claim 2, wherein the nose cone, at the axially rear end region, engages without play against the radially outer contact surface.

4. The fan according to claim 2, wherein the nose cone, at the axially rear end region, lies with a radial gap against the radially outer contact surface, wherein the radial gap is dimensioned to be watertight.

5. The fan according to claim 2, wherein the radially outer contact surface runs obliquely or parallel with respect to an axial direction over an axial length, wherein the nose cone and the radially outer contact surface engage one another over the axial length.

6. The fan according to claim 1, wherein the concave indentation is configured such that water which passes into the concave indentation will run downward in the circumferential direction and, at a lower collection point, escape again through the axial gap between the axially rear edge of the nose cone and the fan disk.

7. The fan according to claim 1, wherein the circling periphery runs radially outside the fastening elements.

8. The fan according to claim 1, wherein the circling periphery is a monolithic part of the fan disk.

9. The fan according to claim 1, wherein the circling periphery is formed by a separate ring which is connected to the axially front side of the fan disk.

10. The fan according to claim 9, wherein the ring additionally forms the axially forwardly projecting fastening elements by which the nose cone is connected to the fan disk.

11. The fan according to claim 1, wherein the nose cone is connected by bolts to the fastening elements that project from the fan disk.

12. The fan according to claim 1, wherein fastening lugs for receiving balancing weights are formed, spaced apart in the circumferential direction, on the axially front side of the fan disk.

13. The fan according to claim 1, wherein the fastening elements are lug shaped or finger shaped.

14. The fan according to claim 1, wherein the encircling periphery includes a contact surface axially forward of the concave indentation, the contact surface continuously circumferentially engaging an interior of the nose cone over 360° to form a seal between the encircling periphery and the nose cone.

15. The fan according to claim 1, wherein the encircling periphery includes a contact surface axially forward of the concave indentation, the contact surface continuously circumferentially positioned adjacent an interior of the nose cone over 360° to form a seal between the encircling periphery and the nose cone.

16. A gas turbine engine, comprising:
   an engine core which comprises a turbine, a compressor and a core shaft connecting the turbine to the compressor and formed as a hollow shaft;
   the fan according to claim 1, which is positioned upstream of the engine core; and
   a gear box that receives an input from the turbine shaft and outputs drive for the fan to drive the fan at a lower rotational speed than the turbine shaft.

* * * * *